(12) United States Patent
Ziegler et al.

(10) Patent No.: US 7,284,802 B2
(45) Date of Patent: Oct. 23, 2007

(54) STABILIZING DEVICE FOR MOTOR VEHICLES COMPRISING COMPRESSED-AIR BRAKING SYSTEMS

(75) Inventors: Andreas Ziegler, Weissach (DE); Stefan Hummel, Stuttgart (DE); Dieter Woerner, Eppingen (DE); Frank Schwab, Knittlingen (DE); Michael Herges, Korntal-Muenchingen (DE); Falk Hecker, Markgroeningen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/343,203

(22) PCT Filed: Jul. 30, 2001

(86) PCT No.: PCT/EP01/08819

§ 371 (c)(1),
(2), (4) Date: Aug. 19, 2003

(87) PCT Pub. No.: WO02/09990

PCT Pub. Date: Feb. 7, 2002

(65) Prior Publication Data

US 2004/0032162 A1    Feb. 19, 2004

(30) Foreign Application Priority Data

Aug. 2, 2000  (DE) ............................ 100 38 046

(51) Int. Cl.
  *B60T 13/00*  (2006.01)
(52) U.S. Cl. .................... 303/7; 303/123; 303/146
(58) Field of Classification Search ............. 303/7, 303/15, 123, 127, 140, 146, 118.1, 113.2
See application file for complete search history.

(56) References Cited

U.S. PATENT DOCUMENTS

| | | | | |
|---|---|---|---|---|
| 4,616,881 A * | 10/1986 | Muller et al. | .................. | 303/7 |
| 4,819,998 A * | 4/1989 | Goebels et al. | .......... | 303/118.1 |
| 5,010,982 A * | 4/1991 | Sedlmayr | .................... | 188/4 B |
| 5,120,114 A * | 6/1992 | Schlichenmaier et al. | .. | 303/123 |
| 5,211,449 A * | 5/1993 | Amtsfeld | .................... | 303/9.66 |
| 6,048,040 A * | 4/2000 | Ross | ........................ | 303/119.1 |
| 6,176,555 B1 * | 1/2001 | Semsey | ........................ | 303/7 |
| 6,183,052 B1 * | 2/2001 | Harada et al. | ............. | 303/147 |
| 6,223,114 B1 | 4/2001 | Boros et al. | ................. | 701/70 |
| 6,264,289 B1 | 7/2001 | Franke et al. | ................ | 303/20 |

FOREIGN PATENT DOCUMENTS

| | | |
|---|---|---|
| DE | 197 55 431 A1 | 6/1999 |
| DE | 198 12 237 C1 | 9/1999 |
| JP | 10-273027 | * 10/1998 |

* cited by examiner

*Primary Examiner*—Bradley King
(74) *Attorney, Agent, or Firm*—Crowell & Moring LLP

(57) ABSTRACT

The invention relates to a motor vehicle comprising a compressed-air braking system. Said vehicle has two braking cylinders, which can be impinged by compressed-air from a compressed-air reserve by means of a manually actuated brake valve. The braking cylinders have ABS pressure-control valves, which can be selectively impinged by compressed air from the compressed-air reserve, using a slip control valve. A stability sensor detects a motor vehicle position and a control device selectively supplies the slip control valve and the ABS pressure-control valves with compressed air, in accordance with the signals of the stability sensor.

2 Claims, 3 Drawing Sheets

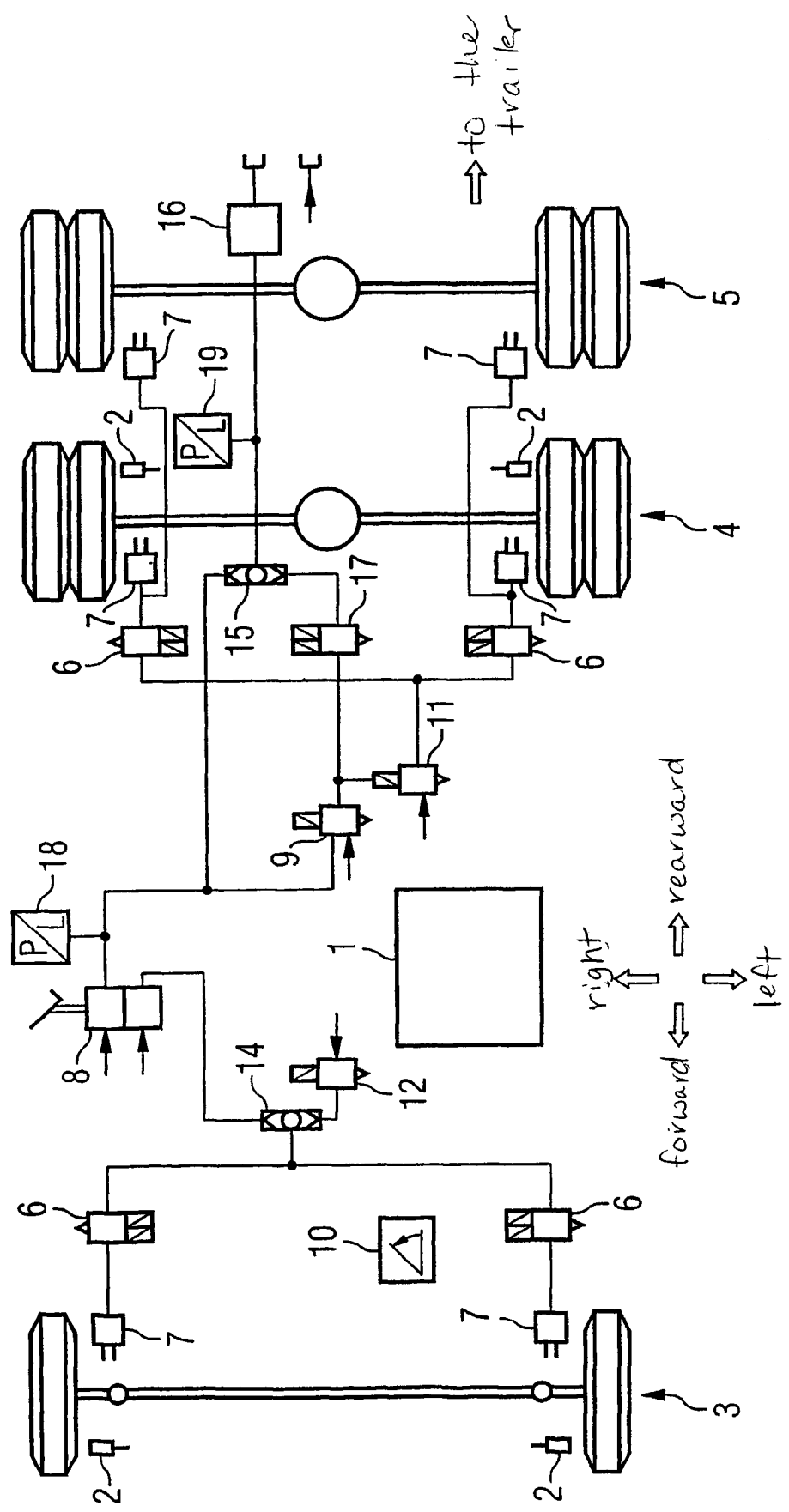

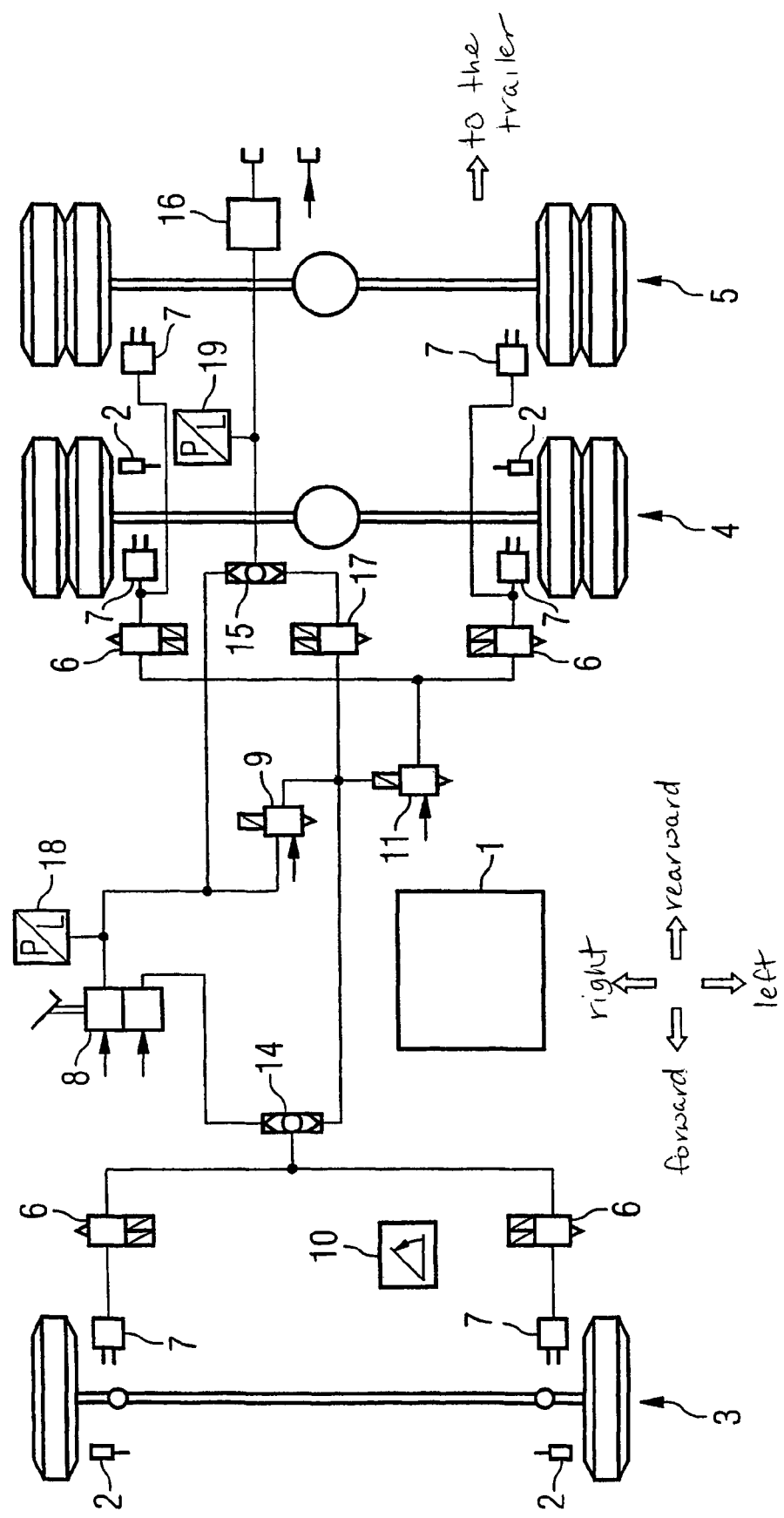

STABILIZING DEVICE FOR MOTOR VEHICLES COMPRISING COMPRESSED-AIR BRAKING SYSTEMS

BACKGROUND AND SUMMARY OF THE INVENTION

The invention relates to a stabilizing device for motor vehicles having pneumatically operated braking systems.

It is known to use an electronic stabilizing program (ESP in connection with an electronic braking system (EBS) for stabilizing motor vehicles. In the case of such an ESP, the vehicle is stabilized in critical situations by automatic wheel-selective brake interventions or by engine interventions. In the case of a passenger car ESP, the vehicle is stabilized, for example, during a beginning of a swerve, by automatic wheel-selective brake interventions as well as by engine interventions. When the instability of the vehicle starts, the measured vehicle movement will no longer correspond to the (intended) vehicle movement defined by the driver via the steering wheel. In this situation, the ESP stabilizes the vehicle by means of wheel-selective brake interventions and by means of engine interventions, so that the movement corresponds to the driver's intention—within physical possibilities. Thus, for example, during oversteering, the front wheel, which is on the outside during cornering, will mainly be braked and, during understeering, the rear wheel, which is on the inside during cornering, will mainly be braked. For this purpose, in addition to the ABS sensor system (rotational wheel speed sensors at each wheel), sensors are also used for the steering wheel angle (driver's intention) as well as for the yaw rate and the lateral acceleration of the vehicle (actual movement) (ABS=antilock system). In order to be able to stabilize the vehicle during braking by the driver, information concerning the driver's braking intention is additionally required.

The braking of a desired individual wheel of the vehicle can take place without any problem in the case of an EBS system as a result of its structure.

The ESP for commercial vehicles, currently for semitrailer units, represents a further development of the passenger car ESP in order to cover two additional degrees of freedom—jackknifing and overturning. It is based on an electronic braking system (EBS), which is expanded by ESP sensors (steering wheel angle, yaw rate and lateral acceleration). In this case, for stabilizing the vehicle combination at a low coefficient of friction (DSP function), for example, during oversteering, the entire semitrailer is braked in addition to the front wheel which is on the outside during cornering. As a result of the semitrailer control module, this becomes possible also for conventional semitrailers (equipped only with an ABS). At a middle and high coefficient of friction, a commercial vehicle tends to overturn more easily than swerve, which is why, in this case, the so-called ROP (roll-over protection) function will engage. In this case, when the vehicle threatens to overturn, the speed of the vehicle is reduced by engine and brake interventions to such an extent that the danger of overturning is clearly reduced.

German Patent Document DE 198 13 783 A1 shows a braking system for a vehicle, which achieves driving stability by means of relatively few actuators and by means of a complicated control system.

European Patent Document EP 0 482 374 A1 shows an electro-pneumatic braking system, in which signals of a steering wheel torque sensor are used for improving the vehicle stabilization.

German Patent Document DE 196 40 141 A1 shows a motor vehicle with a pneumatically operated braking system, in which brake cylinders are provided which have ABS pressure control valves. In this case, the ABS control valves are connected to a shuttle valve which, on the one hand, can be connected by way of a brake valve, which is operated by the driver and, on the other hand, by way of an electrically actuable shut-off valve with a compressed air supply. When a control device detects an instability, the brake cylinders are acted upon by compressed air by means of the shut-off valves in order to generate, to increase, or to reduce braking forces at vehicle wheels. As a result, the lateral control force of the vehicle wheels is influenced, and torques are generated about the vertical axis of the vehicle, which torques have the purpose of stabilizing the vehicle's movement. Nevertheless, in the case of vehicles equipped in this manner, dangerous situations may occur during the operation if these vehicles are operated with a trailer or semitrailer.

It is a disadvantage of such known systems that high costs are incurred occur for providing the corresponding actuators. In addition, the known systems have complicated constructions. Nevertheless, the U.S. market in particular has a demand for stabilizing systems, such as the ESP or ROP.

It is an object of the invention to provide an improved motor vehicle.

In this case, an ASR valve provides, in particular, the following functionality. When electrically controlled, the ASR valve switches the pressure at the input of the valve through to its output. When the control is switched off, the pressure at the output is reduced or is reduced and bled.

In this case, an ABS pressure control valve provides, in particular, the following functionality. It has two magnetic valves, one of which, when controlled, separates the pressure at the input from the output. When controlled, the other magnetic valve bleeds the output. Thus, a consuming device connected to the output can be acted upon by pressure in a selective and precise manner. The magnets can also be controlled in a pulsed operation.

An idea on which the invention is based meets the demands according to the task in a manner such that the existing components of an ABS and/or ASR system in a motor vehicle are utilized, such that an ESP function is thereby achieved. Additional components may be provided for this purpose.

Thus, at least one additional valve may be provided which, while bypassing the brake valve actuated by the driver, applies the storage pressure of the vehicle to the wheel valves of the individual brake cylinders. By means of the ABS valves provided at each wheel, which now can virtually only reduce the pressure, the respective pressure for the brake cylinders will then be controlled in the appropriate manner. If it promotes the stability of the vehicle that, on one side, a certain wheel is to be braked while the other wheel of the axle is to be rotated, this can be accomplished by shutting off the pressure on one side, and, on the other side, controlling a certain pressure in front of the corresponding wheel valve.

ABS systems comprise such wheel valves. However, an additional valve, which can control a brake pressure while bypassing the driver, does not exist in the ABS system.

In the case of the stability program according to the invention, the possibility is therefore provided to preferably brake each wheel of the traction vehicle, as well as of the trailer, individually and independently.

In order to make the existing ABS/ASR systems suitable for the ESP, several concepts or embodiments will be introduced in the following. All these have in common that ABS and/or ASR components are used for keeping costs as low as possible.

The invention can be used in a simple manner in the case of traction vehicles and trailers. As a result, an ESP is provided for motor vehicles with pneumatically operated braking systems, which has almost the same control and regulating possibilities as electromechanical ESP systems. When the engine timing is additionally acted upon, a simple and good stabilization can be achieved in this manner in many emergency situations.

BRIEF DESCRIPTION OF THE DRAWINGS

The invention is illustrated in the drawing by means of several embodiments.

FIG. 2 is a view of a schematic connection diagram of a second motor vehicle; and FIG. 3 is a view of a schematic connection diagram of a third motor vehicle.

DETAILED DESCRIPTION OF THE DRAWINGS

Figure 1:
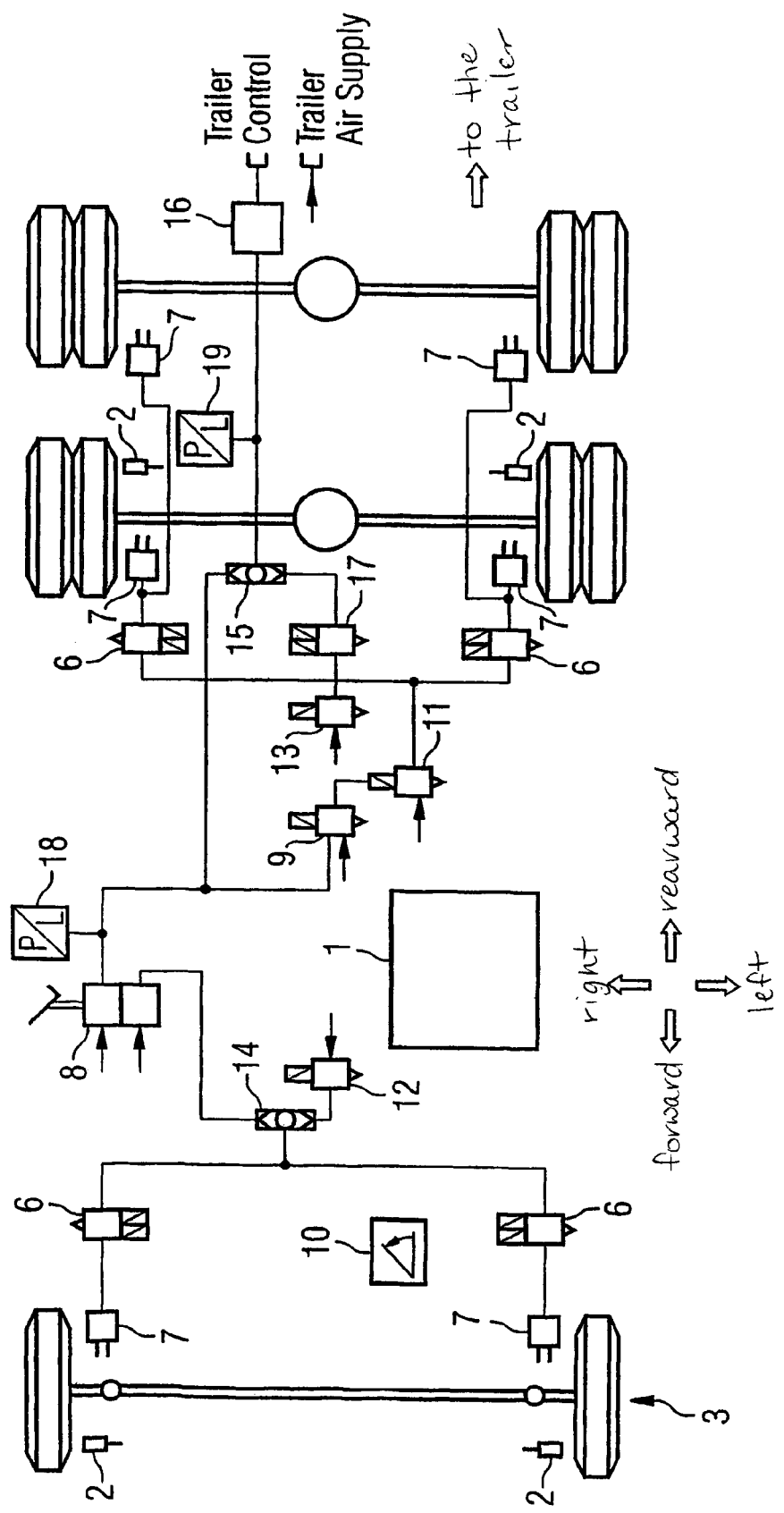
FIG. 1 is a view of a schematic connection diagram of a first motor vehicle.

The embodiments show the respective pneumatic system and the corresponding sensor system. The starting point for all of these embodiments is a (at least) 4-channel ABS system with an ASR brake and engine intervention with the following components:

central control unit 1 with a CAN connection (or similar interface to the engine);
ATC=automatic traction control; and
ECU=electronic control unit The total cluster has to provide ASR, ABS and ESP functions and may consist of several control units:

Four rotational speed sensors 2 (=SS) for the wheels of the motor vehicle (one rotational speed sensor 2, respectively, for the wheels of the front axle 3; one rotational speed sensor 2, respectively, for the wheels of the forward rear axle 4; no rotational speed sensor for the wheels of the rearward rear axle 5);

four pressure control valves 6 for the wheel brake cylinders 7 (one pressure control valve 6, respectively, for the wheel brake cylinders 7 of the front axle 3; one pressure control valve 6 for two wheel brake cylinders 7 of the forward rear axle 4 and of the rearward rear axle 5 situated on the same vehicle side). The pressure control valves 6 are constructed as ABS valves, which can be selectively bled so that a wheel braked per se can be released again;

a brake valve 8 for being actuated by the driver of the motor vehicle;

a compressed air supply which is available at the points indicated by a thick arrow;

an ASR valve 9 which, in a known manner, in connection with the pressure control valves 6, provides the wheel slip control ASR;

a relay valve 11, in the case of which a small control mass from the ASR valve 9 controls a large working mass from the "supply"; and a known trailer protection (TP) valve 16.

FIG. 1 shows the further development of the invention according to a first pneumatic concept.

In addition to the above-mentioned components,
an ASR valve 12 for the front-axle control,
an ASR valve 13 for the trailer control,
a shuttle valve 14 for the front-axle control,
a shuttle valve 15 for the trailer control,
a steering angle sensor 10,
a pressure control valve 17 for controlling the trailer,
a first pressure sensor 18 at the brake valve 8, and
a second pressure sensor 19 between the shuttle valve 15 and the TP valve 16 are provided.

Under normal operation without an ESP intervention, the two pressure sensors 18, 19 should always indicate essentially the same value. This is used for the function control of the pressure sensors.

By means of this arrangement, each individual wheel can be individually braked by way of the ASR valves and the pressure control valves (similarly to what takes place in the case of the ASR), specifically also when the driver does not actuate the brake valve 8. The same applies to the trailer.

When the stability system according to the invention provides that the trailer brakes are to be braked without any actuation of the brake valve 8, the following takes place. First, the ASR valve 13 is actuated so that the pressure control valve 17 is acted upon by compressed air from the supply. As a result, the TP valve 16 for the trailer is controlled so that the wheels of the trailer are braked. In the case of this braking function, the pressure built up in the direction of the trailer is measured by means of the second pressure sensor 19 and is readjusted according to a defined value. If the driver brakes during an ESP intervention, this is detected by way of the first pressure sensor 18 and the brake pressure demanded by the driver is measured. This measured brake pressure or demanded brake pressure is taken into account during the braking of the trailer by means of the pressure control valve 17 such that the brake pressure is added to the pressure required according to the ESP intervention and is transmitted to the trailer. Without a momentary ESP intervention, the controlling-in of the pressure in the case of a driver braking takes place in a conventional manner by means of the shuttle valve 15. The shuttle valve 15 switches back and forth between the "ESP pressure" and the demanded pressure according to the principle of a maximum selection.

When the stability system according to the invention provides that the left front wheel is braked without any actuation of the brake valve 8, the following takes place. First, the ASR valve 12 is actuated so that the two pressure control valves 6 on the front axle are acted upon by compressed air from the supply. In this case, the pressure control valve 6 for the right wheel of the front axle is controlled such that this wheel can rotate. The pressure control valve 6 for the left wheel of the front axle is controlled such that this wheel is braked. For this purpose, by way of the corresponding pressure control valve, a pressure is controlled into the brake cylinder 7 by the variation of the pulse rate and the length of the compressed-air blasts of the inlet magnet of the pressure control valve, which inlet magnet is not shown here. In this case, a pressure estimation algorithm of the ABS is used so that an intended braking can take place without having to measure the pressure in the connection line between the pressure control valve 6 and the brake cylinder 7. If the driver brakes during an ESP intervention, this is detected by way of the first pressure sensor 18 and the brake pressure demanded by the driver is measured. This measured brake pressure or demanded pressure is taken into account during the braking of the wheels of the front axle 3 by means of the pressure control valves 6 such that the brake pressure is added to the pressure required according to the ESP intervention and is transmitted to the corresponding brake cylinder (here to the left brake cylinder). Without a momentary ESP intervention (here, on the right brake cylinder), the controlling-in of the pressure takes place only according to the brake pressure. Without any ESP intervention, the controlling-in of the pressure during a driver's braking takes place in the conventional manner by means of the shuttle valve 14. According to the principle of a maximum selection, the shuttle valve switches back and forth between the "ESP pressure" and the demanded pressure.

When the stability system according to the invention provides that both left rear wheels are to be braked without any actuation of the brake valve 8, the following takes place. First, the ASR valve 9 is actuated so that the two pressure control valves 6 at the rear axles are acted upon by compressed air from the supply by way of the relay valve 11. Then, the pressure control valve 6 for the right wheels of the rear axles is controlled such that these wheels can rotate. The pressure control valve 6 for the left wheels of the rear axles is controlled such that these wheels are braked. When the driver brakes during an ESP intervention, this is detected by means of the first pressure sensor 18 and the brake pressure demanded by the driver is measured. This measured brake pressure or demanded pressure is taken into account when braking the wheels of the rear axles 4, 5 by means of the pressure control valves 6 such that the brake pressure is added to the pressure required according to the ESP intervention and is transmitted to the corresponding brake cylinder (here to the left brake cylinder). Without an ESP intervention (here at the right brake cylinder), the controlling-in of the pressure takes place only according to the brake pressure.

Advantages:

Complete ESP function possible;

can be implemented by the addition of standard components to a conventional braking system;

no new components required (spare part supply);

improved ABS function as a result of the knowledge of the driver's intention; and no mutual influencing of the axles of the vehicle and of the trailer (completely separated by three ASR valves).

FIG. 2 shows the embodiment of the invention according to a second pneumatic concept.

The embodiment according to FIG. 2 essentially corresponds to the embodiment according to FIG. 1.

However, in contrast to the embodiment according to FIG. 1, the embodiment according to FIG. 2 has no ASR valve 13.

Also by means of this arrangement, each individual wheel can be braked individually by means of the ASR valves 9, 12 and the pressure control valves 6, 17 (similarly to what takes place in the case of the ASR). The trailer is also controlled by way of the ASR valve of one of the two axles (preferably by way of the ASR valve 9 of the rear axle) and the additional pressure control valve 17. When the driver brakes during an ESP intervention, this is detected by way of the pressure sensor 18 and the demanded pressure is adjusted by means of the pressure control valves 6, 17. Without any ESP intervention, the controlling-in of pressure in the case of a driver's braking takes place in the conventional manner by means of the shuttle valves 14, 15 (maximum selection).

Advantages:

no mutual influencing of the axles (completely separated by two ASR valves 9, 12);

mutual influence between the rear axle and the trailer basically possible because controlled by way of the same ASR valve 9;

controlling of the trailer brake pressure by way of the coupling with one of the two axles requires slightly higher expenditures because the effect of the influencing is compensated by the pressure control valves 6, 17 at the respective brake cylinders;

complete ESP function possible;

can be implemented by the addition of standard components to a conventional braking system; and no new components required (spare parts supply).

FIG. 3 shows an embodiment of the invention according to a third pneumatic concept.

The embodiment according to FIG. 3 corresponds essentially to the embodiment according to FIG. 2.

However, in contrast to the embodiment according to FIG. 2, the embodiment according to FIG. 3 has no ASR valve 12.

Also by means of this arrangement, each individual wheel can be braked individually by means of the ASR valve 9 and the pressure control valves 6, 17 (similarly to what takes place in the case of the ASR). The trailer and the front axle are also controlled by way of the already existing ASR valve 9 of the rear axle (and in the case of the trailer, the additional pressure control valve 17). When the driver brakes during an ESP intervention, this is detected by way of the pressure sensor 18 and the demanded pressure is adjusted by means of the pressure control valves 6, 17. Without any ESP intervention, the controlling-in of pressure in the case of a driver's braking takes place in the conventional manner by means of the shuttle valves 14, 15 (maximum selection).

Advantages:

mutual influencing of the axles and mutual influencing of the rear axle and the trailer basically possible because controlled by means of the same ASR valve 9);

controlling of the trailer brake pressure by way of the coupling with one of the two axles requires slightly higher expenditures because the effect of the influencing is compensated by the pressure control valves 6, 17 at the respective brake cylinders;

complete ESP function possible;

can be implemented by the addition of standard components to a conventional braking system; and no new components required (spare parts supply).

The invention is also based on a simple sensor system concept. In addition to the sensor used in the case of conventional ABS/ASR systems, only a few other sensors have to be provided:

Two or more pressure sensors 18, 19 for sensing the driver's brake pressure (admission pressure) and at least one brake pressure (at the front wheels or rear wheels or behind the pressure control valve to the trailer);

a yaw rate sensor, a lateral acceleration sensor, and/or a steering (wheel) angle sensor 10.

By means of this simple sensor system, a complete ESP function can be represented.

Advantages:

Complete ESP function possible;

improved ABS function as a result of the knowledge of the driver's intention; and very good monitoring possibilities (pressure sensor can be checked during each braking).

According to the invention, the steering angle sensor 10, whose installation, in the individual case, requires high expenditures, may also be omitted. The function for avoiding overturning is not very affected by the absence of a steering angle sensor. Also, stabilization interventions against a jackknifing can still be carried out in that the sideslip angle or the sideslip angle rate of the traction vehicle are more included in the control. In the case of this concept, there is no risk—which exists in the case of a pure ROP function—that, in the case of a ROP brake intervention, the vehicle jackknifes because of this intervention and the situation could therefore be caused to deteriorate by means of the ROP because the jackknifing is prevented by corresponding stabilization interventions.

Table of Reference Numbers

| | |
|---|---|
| 1 | Central control unit |
| 2 | rotational speed sensor |
| 3 | front axle |
| 4 | forward rear axle |
| 5 | rearward rear axle |
| 6 | pressure control valve |
| 7 | wheel brake cylinder |
| 8 | brake valve |
| 9 | ASR valve |
| 10 | steering angle sensor |
| 11 | relay valve |
| 12 | ASR valve |
| 13 | ASR valve |
| 14 | shuttle valve |
| 15 | shuttle valve |
| 16 | TP valve |
| 17 | pressure control valve for controlling the trailer |
| 18 | first pressure sensor |
| 19 | second pressure sensor |

The invention claimed is:

1. Motor vehicle having a pneumatically operated braking system, comprising:
   at least one pair of brake cylinders, each pair of brake cylinders having a single shuttle valve, each of the brake cylinders having an ABS pressure control valve, each of the two ABS pressure control valves of each pair of brake cylinders being connected to the single shuttle valve of their respective pair of brake cylinders, wherein, on the one hand, each shuttle valve is connectable by way of a brake valve and, on the other hand, is connectable by way of an ASR valve selectively with compressed air;
   a first pressure sensor for detecting a brake pressure demanded by a driver;
   a stability sensor by which a vehicle position can be detected;
   a control device by which the ASR valve, as a function of signals from the stability sensor, can be acted upon to supply an ESP pressure intended for stabilization, wherein a brake pressure results from an addition of the brake pressure demanded by the driver and the ESP pressure;
   a TP valve, the TP valve being connected to a second shuttle valve which, on the one hand, is connectable by way of the brake valve and, on the other hand, by way of a pressure control valve with compressed air; and
   a second pressure sensor in a compressed-air line from the second shuttle valve to the TP valve for detecting a brake pressure built up to the trailer;
   wherein the control device selectively acts upon the TP valve as a function of the signals from the stability sensor via the ESP pressure intended for stabilization, such that the brake pressure to the TP valve results from an addition of the brake pressure demanded by the driver and the ESP pressure.

2. Pneumatically operated braking system for a motor vehicle, comprising:
   at least one pair of brake cylinders, each pair of brake cylinders having a single shuttle valve, each of the brake cylinders having an ABS pressure control valve, wherein each of the two ABS pressure control valves of each pair of brake cylinders are connected to the single shuttle valve of their respective pair of brake cylinders, and on the one hand, each shuttle valve is connectable by way of a brake valve and, on the other hand, is connectable by way of an ASR valve selectively with compressed air;
   a first pressure sensor for detecting a brake pressure demanded by the driver;
   a stability sensor by which a vehicle position can be detected;
   a control device being provided by which the ASR valve, as a function of signals of the stability sensor, can be acted upon to supply an ESP pressure intended for the stabilization, wherein a brake pressure results from an addition of the brake pressure measured by the pressure sensor and the ESP pressure;
   a TP valve, the TP valve being connected to a second shuttle valve which, on the one hand, is connectable by way of the brake valve and, on the other hand, by way of a pressure control valve with compressed air; and
   a second pressure sensor in a compressed-air line from the second shuttle valve to the TP valve for detecting a brake pressure built up to the trailer;
   wherein the control device selectively acts upon the TP valve as a function of the signals from the stability sensor via the ESP pressure such that the brake pressure to the TP valve results from an addition of the brake pressure demanded by the driver and the ESP pressure.

* * * * *